(12) United States Patent
Chen et al.

(10) Patent No.: US 8,073,345 B2
(45) Date of Patent: Dec. 6, 2011

(54) FREQUENCY ESTIMATION IN AN INTRADYNE OPTICAL RECEIVER

(75) Inventors: Young-Kai Chen, Berkeley Heights, NJ (US); Noriaki Kaneda, Westfield, NJ (US); Ut-Va Koc, Bridgewater, NJ (US); Andreas Bertold Leven, Gillette, NJ (US)

(73) Assignee: Alcatel Lucent, Paris (FR)

( * ) Notice: Subject to any disclaimer, the term of this patent is extended or adjusted under 35 U.S.C. 154(b) by 665 days.

(21) Appl. No.: 11/644,536

(22) Filed: Dec. 22, 2006

(65) Prior Publication Data
US 2008/0152361 A1 Jun. 26, 2008

(51) Int. Cl.
*H04B 10/06* (2006.01)
(52) U.S. Cl. ......... 398/205; 398/202; 398/204; 398/208
(58) Field of Classification Search ........... 398/204–207
See application file for complete search history.

(56) References Cited

U.S. PATENT DOCUMENTS

| | | | |
|---|---|---|---|
| 4,732,447 A * | 3/1988 | Wright et al. ............. | 385/46 |
| 5,077,531 A * | 12/1991 | Takeuchi et al. .......... | 329/304 |
| 5,920,228 A * | 7/1999 | Soga et al. ................ | 329/304 |
| 6,038,267 A * | 3/2000 | Oura et al. ................ | 375/329 |
| 6,314,145 B1 * | 11/2001 | van Driest ................ | 375/326 |
| 7,327,913 B2 * | 2/2008 | Shpantzer et al. ......... | 385/15 |
| 2006/0245766 A1 * | 11/2006 | Taylor ...................... | 398/208 |
| 2007/0036555 A1 * | 2/2007 | Chen et al. ................ | 398/188 |
| 2007/0092259 A1 * | 4/2007 | Bontu et al. .............. | 398/147 |
| 2007/0297806 A1 * | 12/2007 | Kaneda et al. ............ | 398/152 |
| 2008/0008268 A1 * | 1/2008 | Koc ......................... | 375/329 |

OTHER PUBLICATIONS

"Blind Equalization Using the Constant Modulus Criterion: A Review" by C. Richard Johnson, Jr. et al, published in *Proceedings of the IEEE*, vol. 86, No. 10, Oct. 1998, pp. 1927-1950.
"Digital Equalisation of 40 Gbit/s per Wavelength Transmission over 2480km of Standard Fibre without Optical Dispersion Compensation" by S.J. Savory et al, published in *Proceedings of the 32nd European Conference of optical communications* (ECOC), vol. 4, pp. 105-106, Sep. 28, 2006.
*Digital Communication Receivers—Synchronization, Channel Estimation, and Signal Processing*, by H. Meyr, M. Moeneclaey, and S. A. Fechtel (Wiley, 1998) pp. 4356-4463.
U.S. Appl. No. 11/204,607, filed Aug. 15, 2005, Chen et al.
U.S. Appl. No. 11/644,555, filed Dec. 22, 2006, Koc.

(Continued)

*Primary Examiner* — Nathan Curs
*Assistant Examiner* — Tanya Ngo
(74) *Attorney, Agent, or Firm* — John F. McCabe

(57) ABSTRACT

A method for determining symbols PSK modulated on an optical carrier includes interfering a first polarization component of the modulated optical carrier and a reference optical carrier in a first optical mixer and interfering the first polarization component of the modulated optical carrier and the reference with a different relative phase in a second optical mixer. The method also includes sampling the interfered carriers from the first optical mixer to produce first digital sampled values and sampling the interfered carriers from the second optical mixer to produce second digital sampled values. The first and second digital sampled values of a sampling period form a first complex sampling value thereof. The method also includes offsetting a phase of a complex signal value corresponding to each first complex sampling value to correct for a phase error caused by a frequency offset between the modulated and reference optical carriers.

15 Claims, 9 Drawing Sheets

OTHER PUBLICATIONS

Reinhold Noe, "Phase Noise-Tolerant Synchronous QPSK/BPSK Baseband-Type Intradyne Receiver Concept With Feedforward Carrier Recovery", Journal of Lightwave Technology, vol. 23., No. 2, Feb. 2005, pp. 802-808.

Yan Han and Guifang Li, "Coherent Optical Communication Using Polarization Multiple-Input-Multiple-Output", Optics Express, Sep. 19, 2005 / vol. 13, No. 19, pp. 7527-7534.

Andreas Leven, et al, "Frequency Estimation in Intradyne Reception," *IEEE Photonics Technology Letters*, vol. 19, No. 6, Mar. 15, 2007, pp. 366-368.

U.S. Appl. No. 11/426,191, filed Jun. 23, 2006, N. Kaneda, et al.

U.S. Appl. No. 11/483,280, filed Jul. 7, 2006, U-V. Koc.

F. Derr, "Optical QPSK Transmission System With Novel Digital Receiver Concept," *Electronics Letters*, vol. 27, No. 23, pp. 2177-2179, Nov. 7, 1991.

U-V. Koc, et al, "Digital Coherent Quadrature Phase-Shift-Keying (QPSK)," in *Proc. Optical Fiber Conference and the 2006 National Fiber Optic Engineers Conference* (OFC), Anaheim, CA, Mar. 5-10, 2006, 3 pages.

D-S, Ly-Gagnon, et al, "Coherent Detection of Optical Quadrature Phase-Shift Keying Signals With Carrier Phase Estimation," *Journal of Lightwave Technology*, vol. 24, No. 1, Jan. 2006, pp. 12-21.

T. Pfau, et al, "First Real-Time Data Recovery for Synchronous QPSK Transmission With Standard DFB Lasers," *IEEE Photonics Technology Letters*, vol. 18, No. 18, Sep. 15, 2006, pp. 1907-1909.

M.G. Taylor, "Accurate Digital Phase Estimation Process for Coherent Detection Using a Parallel Digital Processor," in *Proc. European Conference, Optical Communication, ECOC 2005 Proceedings—* vol. 2, Glasgow, UK., pp. 263-264.

H. Meyr, et al, *Digital Communication Receivers, Synchronization, Channel Estimation, And Signal Processing*, John Wiley & Sons, Inc., New York, 1998 ch. 8.2.2., pp. 457-463.

Soldano, Lucas B. et al, "Optical Multi-Mode Interference Devices Based on Self-Imaging: Principles and Applications", J. of Lightwave Technology, vol. 13, No. 4, Apr. 1995, pp. 615-627.

"Optical Hybrid", Wikipedia, the free encyclopedia, (http://en.wikipedia.org/wiki/Optical_hybrid), Dec. 30, 2006, 4 pages.

\* cited by examiner

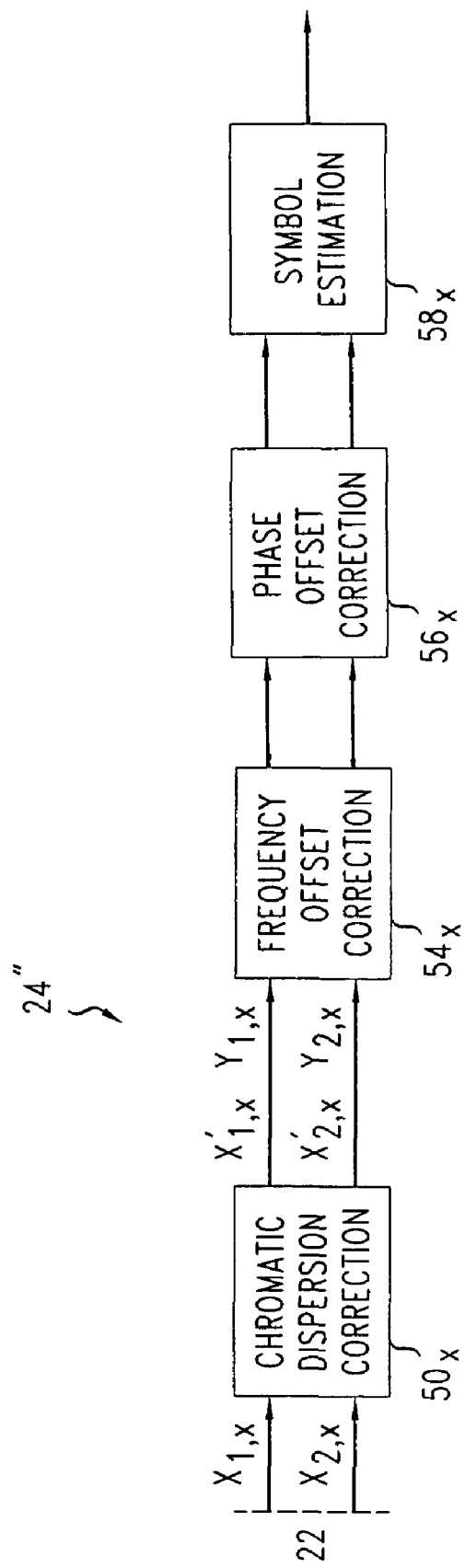

FREQUENCY ESTIMATION IN AN INTRADYNE OPTICAL RECEIVER

BACKGROUND

1. Field of the Invention

The inventions relate to optical receivers and methods of operating optical receivers.

2. Discussion of the Related Art

In some optical communication systems, a coherent optical receiver has a local optical oscillator that is not phase locked to the received data-carrying optical carrier. In such optical receivers, the local optical oscillator still may have a frequency that is close to the center frequency of the data-carrying optical carrier. In particular, an intradyne optical receiver has a local optical oscillator whose frequency is closer to the center frequency of the data-carrying optical carrier than the bandwidth of the data-carrying optical carrier. In an intradyne optical receiver, such approximate frequency matching may be achieved, e.g., without a loop that feeds back information on the received data-carrying optical carrier. That is, the local optical oscillator of an intradyne optical receiver may be free running.

BRIEF SUMMARY

Various embodiments provide for optical receivers and method of optical receiving that compensate for frequency mismatches between a received modulated optical carrier and a local reference optical carrier via digital processing.

One embodiment features an apparatus that includes an optical receiver for receiving a PSK modulated optical carrier. The optical receiver includes an optical hybrid, first and second light detectors, and a digital signal processor. The optical hybrid is configured to output first mixtures of the modulated optical carrier and a reference optical carrier at first outputs and to output second mixtures of the carriers having different relative phases at second outputs. The first light detector is configured to generate first digital values by sampling light intensities at the first outputs. The second light detector is configured to generate second digital values by sampling light intensities at the second outputs. The first and second digital values of a sampling period form a first complex sampled value thereof. The digital signal processor is configured to receive the complex sampled values and to offset phases of first complex signal values obtained there from in a manner that corrects for phase offsets caused by frequency offsets between the modulated and reference optical carriers. The digital signal processor is configured to estimate symbols on the modulated optical carrier from the first complex signal values.

In some embodiments of the apparatus, the digital signal processor includes a phase shift estimator that is configured to estimate phase errors of the complex signal values. Each estimated phase error is caused by the frequency offsets. The phase shift estimator may be configured to evaluate phase shifts between successive ones of the complex digital signal values. The phase shift estimator may be configured to average ones of the evaluated phase shifts for a sequence of the sampling periods.

In some embodiments, the apparatus may further include third and fourth light detectors. The third light detector is configured to generate third digital values by sampling light intensities of another polarization component for mixtures of the carriers. The fourth light detector is configured to generate fourth digital values by sampling light intensities of the another polarization component for mixtures of the carriers of different relative phases than the mixtures sampled by the third light detector. The third and fourth digital values of a sampling period form a second complex sampled value thereof. The digital signal processor may be configured to receive the second complex sampled values, to obtain second complex signal values there from, and to estimate other PSK symbols modulated onto the modulated optical carrier based, at least, in part on the second complex signal values. The digital signal processor may be configured to perform transformations that linearly mix the first and complex sampled values in a manner that compensates polarization rotations of the modulated optical carrier produced after transmission to an optical communications channel.

Another embodiment features a method of determining symbols PSK modulated on an optical carrier. The method includes interfering a first polarization component of the modulated optical carrier and a reference optical carrier with first relative phases and interfering the first polarization component of the modulated optical carrier and the reference with second relative phases different from the first relative phases. The method also includes sampling the carriers interfered with the first relative phases to produce first digital values and sampling the carriers interfered with the second relative phases to produce second digital values. The first and second digital values of a sampling period form a first complex sampled value thereof. The method also includes correcting a phase of a complex signal value corresponding to each first complex sampled value to correct for phase errors caused by frequency offsets between the modulated and reference optical carriers.

In some embodiments, the method further includes estimating values of the symbols from the first complex signal values. The method may further include comparing succeeding ones of the complex signal values to evaluate the phase errors caused by the frequency offsets. The method may include obtaining the complex signal values by correcting the complex sampled values for polarization rotations caused by transmission over an optical communications channel. The method may be such that the estimating includes determining values of the symbols that were polarization multiplexed onto the optical carrier based in part on the first complex sampled values.

In some embodiments, the method may include producing fourth digital values by sampling another polarization component of a mixture produced by interfering the carriers with specific relative phases and producing fourth digital values by sampling the another polarization component of a mixture produced by interfering carriers with relative phases different from the specific relative phases. The third and fourth digital values of a sampling period form a second complex sampled value thereof. In such embodiments, the method includes estimating values of symbols nontrivially polarization multiplexed onto the modulated optical carrier based on the first and second complex signal values. The method may further include correcting a phase of a second complex signal value corresponding to each second complex sampled value to correct for phase errors caused by the frequency offsets.

BRIEF DESCRIPTION OF THE DRAWINGS

FIG. 8 is a block diagram for one embodiment of a DSP that may be used in the optical receiver of FIG. 7.

In the Figures and text, like reference numerals indicate elements with similar functions.

In the Figures, the relative dimensions of some features may be exaggerated to more clearly illustrate one or more of the structures therein.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

While an optical coherent receiver with free-running local optical oscillator may use various schemes to digitally process the received optical data stream, some such schemes can only tolerate very small frequency differences between the local optical oscillator of the optical receiver and the carrier of the optical data stream. The use of digital differential decoding may enable tolerating somewhat larger frequency differences, but the tolerance level for such frequency differences is not large. Thus, it is desirable to have optical receivers in which digital signal processing enables the toleration of a significant mismatch between the frequency of the data-carrying optical carrier and the frequency of the receiver's local optical oscillator. Herein, some embodiments of optical receivers provide for such digital signal processing.

Methods and apparatus for coherent optical reception are described in U.S. patent application Ser. No. 11/204,607, filed on or about Aug. 15, 2005, by Young-Kai Chen et al, which is incorporated herein by reference in its entirety.

Figure 1A:
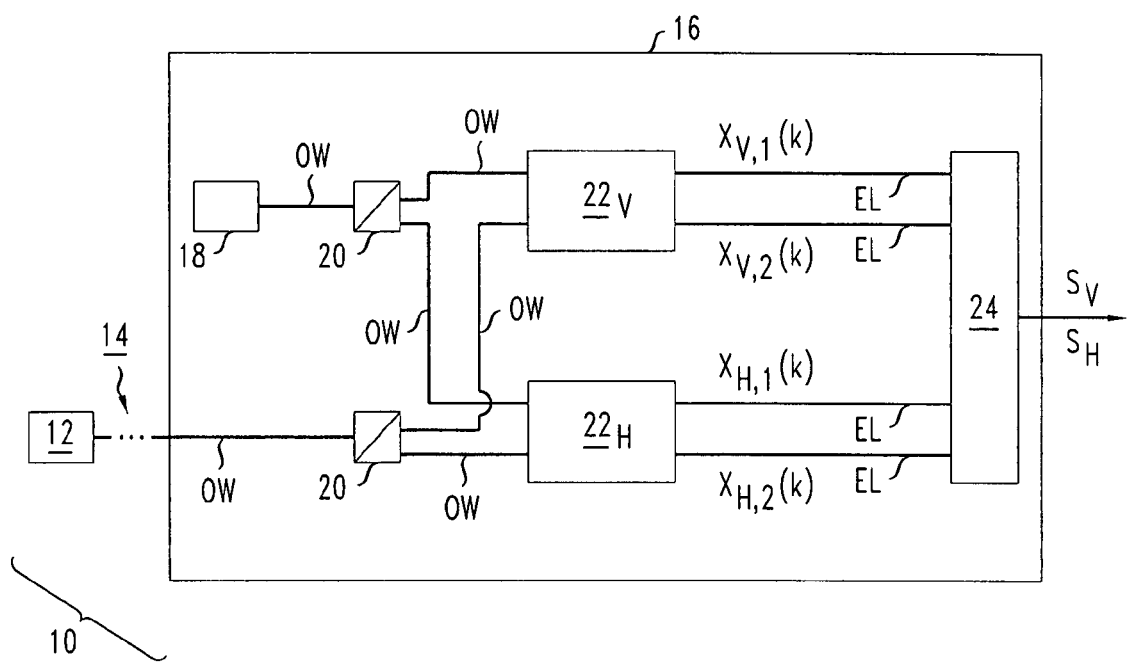
FIG. 1A is a block diagram illustrating one type of polarization-sensitive optical receiver.

FIG. 1A shows an optical receiver 16 that receives a PSK modulated optical carrier from an optical transmitter 12 via an optical communications channel 14, e.g., a fiber of free-space optical channel. The optical receiver 16 has embodiments that may receive and demodulate data from an optical carrier that has polarization multiplexed data thereon or may receive and demodulate data from an optical carrier in a polarization diverse manner. The optical receiver 16 includes a local optical oscillator 18; polarization splitters 20; 2×2 hybrid optical detectors 22V, 22H; a digital signal processor (DSP) 124; and a plurality of optical waveguides (OWs) and electrical lines (ELs) that connect elements 18, 20, 22V, 22H, 24, and optical and electrical ports of the optical receiver 16. Herein, the letters and subscripts "V" and "H" will be used to indicate two non-parallel linear polarization components, e.g., the "vertical" and "horizontal" components in a laboratory frame.

The local optical oscillator 18 produces a continuous-wave (CW) reference optical carrier at about the wavelength of the modulated optical carrier received from the optical communications channel 14. The local optical oscillator 18 be, e.g., a stabilized diode laser. For example, the laser may include a conventional wavelength locker that keeps its frequency within a preselected maximum offset from the frequency of the modulated optical carrier transmitted by the optical transmitter 12. The local optical oscillator 18 frequency down-mixes the received optical carrier in the hybrid optical detectors 22V, 22H. For that reason, the local optical oscillator 18 is configured to produce the reference optical carrier with a frequency, $\omega_{RC}$, that is approximately equal to the frequency, $\omega_{MC}$, of the data-carrying modulated optical carrier, which is transmitted by the optical transmitter 12. The optical receiver 16 does not, however, have an feedback loop for phase or frequency locking the local optical oscillator 18 to the modulated optical carrier.

The hybrid optical detectors 22V, 22H receive and coherently mix the modulated optical carrier from the optical communications channel 14 with the CW reference optical carrier from the local optical oscillator 18. By such mixing, each hybrid optical detector 22V, 22H produces a stream of first complex digital sampled values, i.e., the stream of $X_V(k)$s, and produces a stream of second digital sampled values, i.e., the stream of $X_H(k)$s. Here, $X_V(k)=[X_{V,1}(k)+i\cdot X_{V,2}(k)]$ and $X_H(k)=[X_{H,1}(k)+i\cdot X_{H,2}(k)]$. The $X_V(k)$s and $X_H(k)$s are complex digital sampled values indicative in amplitude and phase of the respective "V" and "H" linear polarization components of the modulated optical carriers as frequency down-mixed by the reference optical carrier.

The DSP 24 constructs one or two output streams of estimated demodulated PSK symbols, e.g., a stream of $S_V$s and a stream of $S_H$s, from the corresponding one or two streams of complex digital sampled values that are received from the hybrid optical detectors 22V, 22H, i.e., the streams of $X_V(k)$s and of $X_H(k)$s. The DSP 24 may perform various types of digital processing on the complex digital sampled values received from the hybrid optical detectors $22_V$, $22_H$ to improve estimations of the demodulation of data there from. The digital processing may correct or compensate for signal degradations produced by optical transmission and detection, e.g., due to a frequency offset, polarization transformation, polarization mode dispersion, chromatic dispersion, and noise.

Figure 2:
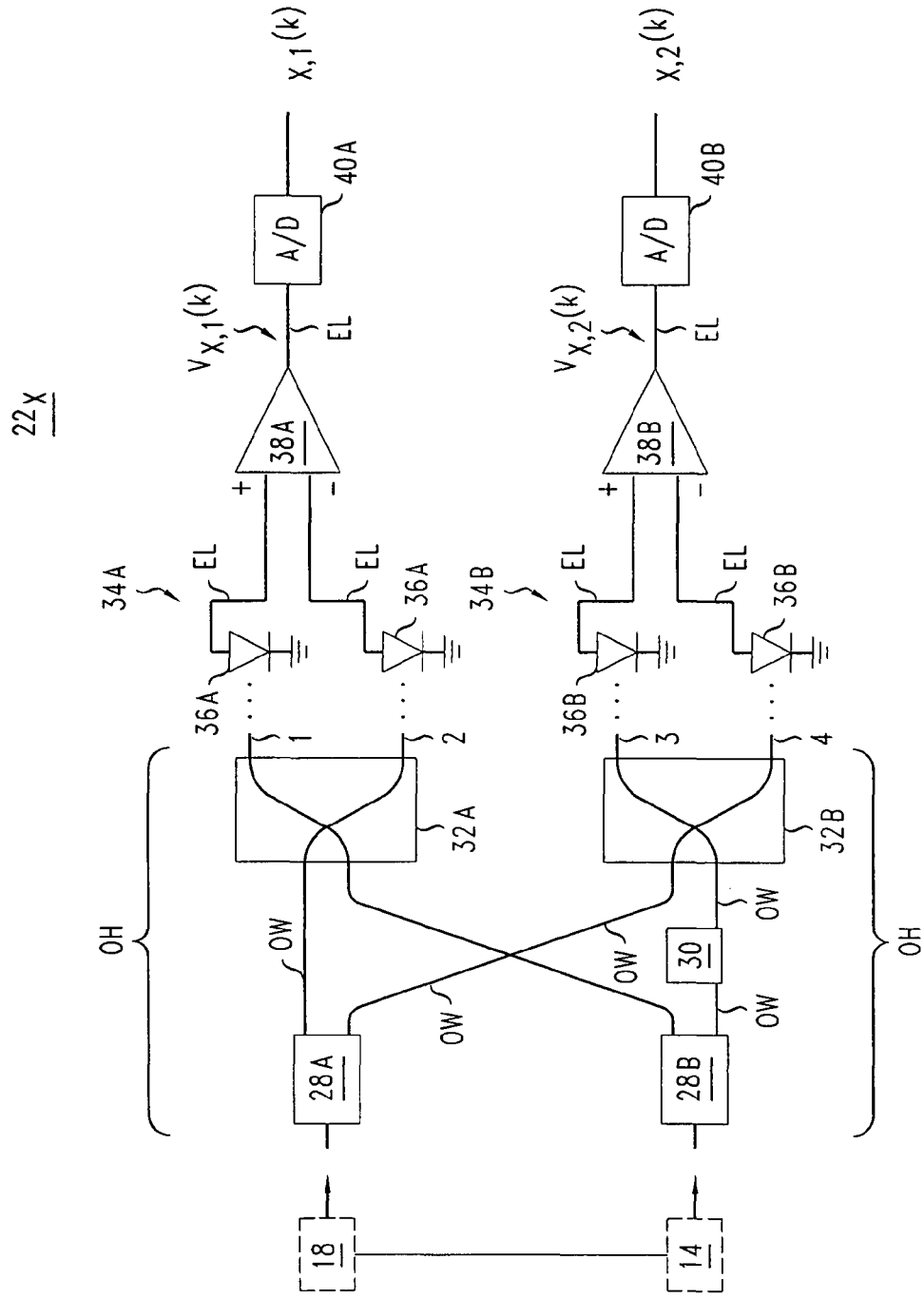
FIG. 2 is a block diagram illustrating the structure of the hybrid optical detectors of FIG. 1A.

FIG. 2 shows a structure $22_X$ for the hybrid optical detectors $22_V$, $22_H$ of FIG. 1A. Below, the subscript "X" refers to linear polarization index "V" and/or "H" as appropriate.

The hybrid optical detector $22_X$ includes an optical hybrid (OH) and first and second optical detectors that measure light intensities output by the optical hybrid via digital sampling.

The optical hybrid includes two 1×2 optical intensity splitters 28A, 28B; an optical phase delay 30; and two 2×2 optical mixers 32A, 32B as well as optical waveguides OW connected to various ones of these elements. The optical hybrid produces at two pairs of optical outputs, e.g., the pair (1,2) and the pair (3,4), interfered mixtures of the modulated and reference optical carriers. The relative intensities of the mixtures at the two outputs of each pair are sensitive to relative phases of the light interfered. The relative phases of the interfered mixtures are different at the first pair of optical outputs than at the second pair of optical outputs.

Each optical detector includes one pair 34A, 34B of photodiodes 36A, 36B; a differential amplifier 38A, 38B; and an analog-to-digital converters 40A, 40B as well as electrical lines EL interconnecting various ones of these elements. Each optical detector measures the optical signals at one pair of the optical outputs of the optical hybrid OH, i.e., the pair (1,2) or the pair (3,4). Indeed, each optical detector produces a sequence of digital electrical values by sampling the intensities of the interfered carriers at one pair of the optical outputs of the optical hybrid.

Each 1×2 optical intensity splitter 28A, 28B power splits received light so that about 50 percent of the light is directed to each of its optical outputs. One of the 1×2 optical intensity splitters 28A is connected to receive light from the local optical oscillator 18. The other of the 1×2 optical intensity splitters 28B is connected to receive light of the modulated optical carrier from the optical communications line 14. Each of the 1×2 optical intensity splitters 28A, 28B is connected to deliver light to an optical input of the 2×2 optical mixer 32A and to an optical input of the other 2×2 optical mixer 32B.

The optical phase delay 30 and connected optical waveguides OW introduce a relative phase delay, Δ, between the light transmitted from the 1×2 optical splitter 28B to the 2×2 optical mixer 32B and the light transmitted from the 1×2 optical splitter 28B to the 2×2 optical mixer 32A. Typically, the relative phase delay Δ is between π/3 and 2π/3 modulo Pπ. The relative phase delay, Δ, is preferably between 3π/8 and 5π/8 modulo Pπ and is more preferably about π/2 modulo Pπ. Here, P is an integer. In contrast, the other optical waveguides, OW, do not introduce a substantial relative phase delay, i.e., modulo Pπ, between the light transmitted from the other optical intensity splitter 28A to the optical mixer 32A and the light transmitted from the other optical intensity splitter 28A to the optical mixer 32B.

Alternately, the optical phase delay 30 may be connected to one of the optical outputs of the 1×2 optical splitter 28A rather than to one of the optical outputs of the 1×2 optical splitter 28B (not shown). Then, the optical phase delay 30 would introduce a relative phase delay Δ between the light transmitted from the 1×2 optical splitter 28A to the 2×2 optical mixer 32A and the light transmitted from the 1×2 optical splitter 28A to the 2×2 optical mixer 32B. Again, the relative phase delay Δ would be between π/3 and 2π/3 modulo Pπ; preferably between 3π/8 and 5π/8 modulo Pπ; and more preferably about 7π/2 modulo P. In this embodiment, the optical waveguides, OW, between the other optical intensity splitter 28B would introduce no relative phase delay, i.e., modulo Pπ, between the light transmitted from the 1×2 optical splitter 28B to the 2×2 optical mixer 32A and the light transmitted from the 1×2 optical splitter 28B to the 2×2 optical mixer 32B.

In the hybrid optical detector $22_X$, each of the 2×2 optical mixers 32A, 32B is connected to receive the same linear polarization component from the modulated optical carrier and the reference optical carrier. The optical mixers 32A, 32B mix, i.e., interfere, the light received at their optical inputs to produce preselected combinations of said light at their optical outputs. The optical mixers 32A, 32B may be, e.g., conventional couplers or multi-mode interference (MMI) devices.

The 2×2 optical mixers 32A, 32B frequency down-mix the modulated optical carrier. The optical mixer 32A mixes the light received at its optical inputs so that the difference between the light intensities at its two optical outputs is indicative of the phase difference between the light received at its two optical inputs. The difference between the two output light intensities is proportional to $\sin(\phi + t \cdot [\omega_{MC} - \omega_{RC}])$. Here, $[(\omega_{MC} - \omega_{RC})]$ is the frequency offset of the modulated optical carrier from the reference optical carrier, "t" is time, and φ is a phase offset between the same two optical carriers. The second optical mixer 32B also mixes the light received at its optical inputs so that the difference between the light intensities at its two optical outputs is indicative of the phase difference between the light received at its two optical inputs. In particular, the difference the two output light intensities is proportional to $\cos(\phi + t \cdot [\omega_{MC} - \omega_{RC}])$ if Δ is π/2 modulus an integer multiple of π.

At each optical output of the 2×2 optical mixers 32A, 32B, a photo-diode 36A, 36B is positioned to detect the intensity of the outputted light. The photo-diodes form two matched pairs 34A, 34B, i.e., with a similar light-sensitivity and bandwidth. Each matched pair 34A, 34B of photo-diodes 36A, 36B transmits to the inputs of one of the differential amplifier 38A, 38B signals whose values are indicative of the detected output light intensities. Optionally, there might be an additional electrical amplifier in-between each photo-diode 36A, 36B and the inputs of the differential amplifier 38A.

Each differential amplifier 38A, 38B outputs an analog voltage, i.e., $V_{X,1}$ or $V_{X,2}$, proportional to the signal difference between its two inputs. Here and below, the subscript "X" may refer to either the "H" linear polarization component or the "V" linear polarization component as appropriate.

From the analog voltages $V_{X,1}$ and $V_{X,2}$, the first and second A/D converters 40A, 40B produce respective first and second temporal sequences of digital sampled values, i.e., $X_{X,1}(k)$, $X_{X,1}(k+1)$, ... and $X_{X,2}(k)$, $X_{X,2}(k+1)$, .... To produce these sequences, the A/D converters 40A, 40B sample the analog voltages $V_{X,1}$ and $V_{X,2}$ at sampling rate equal to or higher than of the modulation/symbol rate of the optical carrier output by the optical transmitter 12. The A/D converters 40A, 40B transmit the digital sampled values $X_{X,1}(k)$ and $X_{X,2}(k)$ to the DSP 24 at sampling period "k". Here, the complex sampled value $X_X(k)$ satisfies: $X_X(k) = X_{X,1}(k) + iX_{X,2}(k)$.

Each complex digital sampled value $X_X(k)$ output by one of the hybrid optical detectors $22_X$ can be modeled as having the form:

$$X_X(k) = [B_X(k) + N_X(k)] \exp[i \cdot \phi_X(k)]. \tag{1}$$

In the above equation, $B_X(k)$ and $\phi_X(k)$ are the amplitude and phase, and $N_X(k)$ is a amplitude noise at the sampling period "k". The phase φ(k) may be represented as $\Phi_B(k) + \Phi_S(k) + k \cdot T_S \cdot (\omega_{MC} - \omega_{RC})$ where $T_S$ is the sampling period, $\Phi_B(k)$ is a phase angle for a PSK symbol, and $\Phi_S(k)$ is an aggregate phase angle noise. The phase angles for PSK symbols have the form Nπ/M where N is a positive integer and less than M. The positive integer M defines the PSK symbol constellation and may be 2, 3, 4, 5, .... For example, M=4 corresponds to the QPSK constellation, and M=8 corresponds to the 8PSK symbol constellation. The aggregate phase angle noise $\Phi_S(k)$ may receive contributions from the line widths of the optical transmitter 12 and the local optical oscillator 18, as well as from optical amplifier noise.

Referring again to FIG. 1A, the DSP 24 receives a 2D complex digital vector X(k) where $X(k) = [X_V(k), X_H(k)]^T$ at each sampling period "k". The components $X_V(k)$ and $X_H(k)$ of 2D complex digital vector X(k) correspond to phases $P_V(k)$ and $P_H(k)$ that the optical transmitter 12 modulated onto polarization components of the transmitted optical carrier. Nevertheless, due to various types of signal degradations, the 2D complex vector X(k) often differs from the transmitted 2D complex vector P(k) where $P(k) = [P_V(k), P_H(k)]^T$.

Figure 1B:
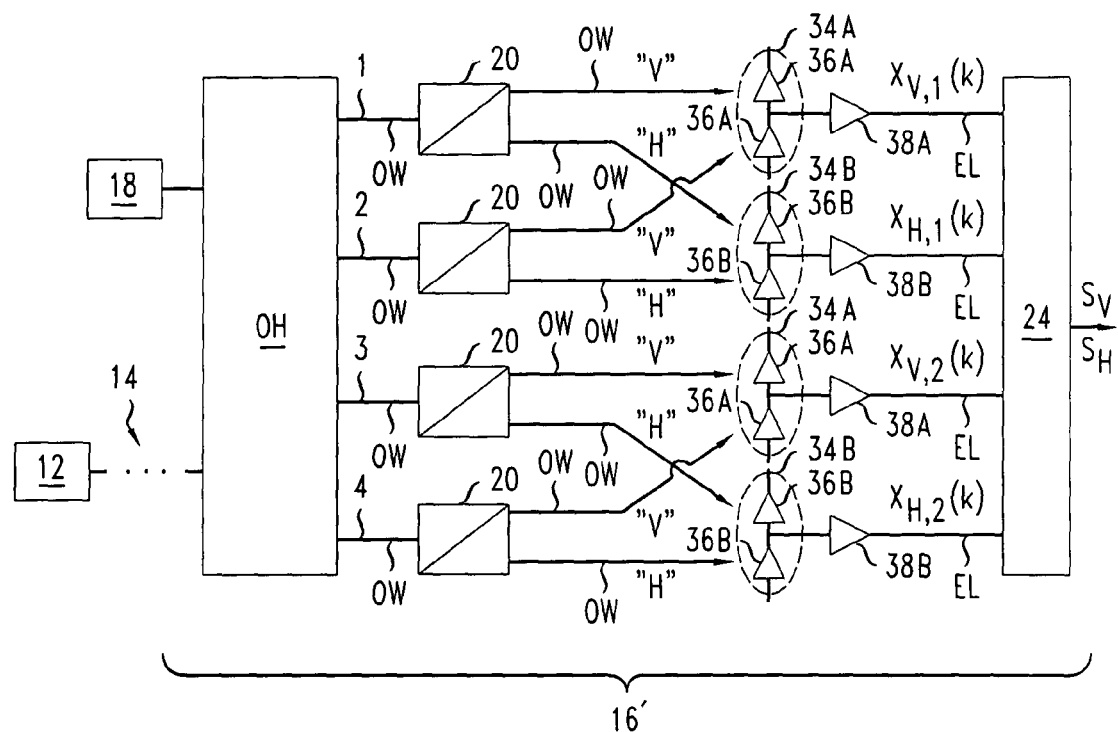
FIG. 1B is a block diagram illustrating an alternate polarization-sensitive optical receiver that includes only one optical hybrid.

FIG. 1B illustrates an alternate embodiment for an optical receiver 16'. The optical receiver 16' includes a local optical oscillator 18, a single optical hybrid OH, four optical polarization splitters 20, four pairs 34A, 34B of matched or balanced photo-diodes 36A, 36B, four amplifiers 38A, 38B, DSP 24, and optical waveguides OW, and electrical lines EL connecting said elements. In the optical receiver 16', each element has a similar construction and/or function as the similarly referenced elements of the optical receiver 16 of FIGS. 1A and 2, e.g., elements referenced as 18, 20, 34A, 34B, 36A, 36B, 38A, 38B, OW, EL. Also, the optical receiver 16' receives and outputs similar optical and electronic signals. In addition, the digital sampled values $X_{V,1}(k)$, $X_{V,2}(k)$, $X_{H,1}(k)$, $X_{H,2}(k)$ that are transmitted to the DSP 24 are similar in the optical receiver 16 and the optical receiver 16'. For that reason, both optical receivers 16, 16' can have substantially identically constructed DSPs 24.

The optical receiver 16' performs polarization splitting at optical outputs 1, 2, 3, 4 of the optical hybrid OH rather than prior to transmitting light thereto. Each optical polarization splitter 20 transmits the two polarization components of the light from one optical output 1, 2, 3, 4 of the optical hybrid OH to different photo-diodes 36A, 36B. For that reason, the optical receiver 16' has a single optical hybrid OH rather than two optical hybrids as in the optical receiver 16 of FIGS. 1A and 2.

In the optical receiver 16', the optical hybrid OH may be a bulk optical hybrid rather than a planar optical hybrid OH as illustrated in FIG. 2. Suitable bulk optical hybrids are commercially sold by Optoplex Corporation of 3374-3390 Gateway Boulevard, Fremont, Calif. 94538, United States (online at www.optiplex.com).

Figure 3:
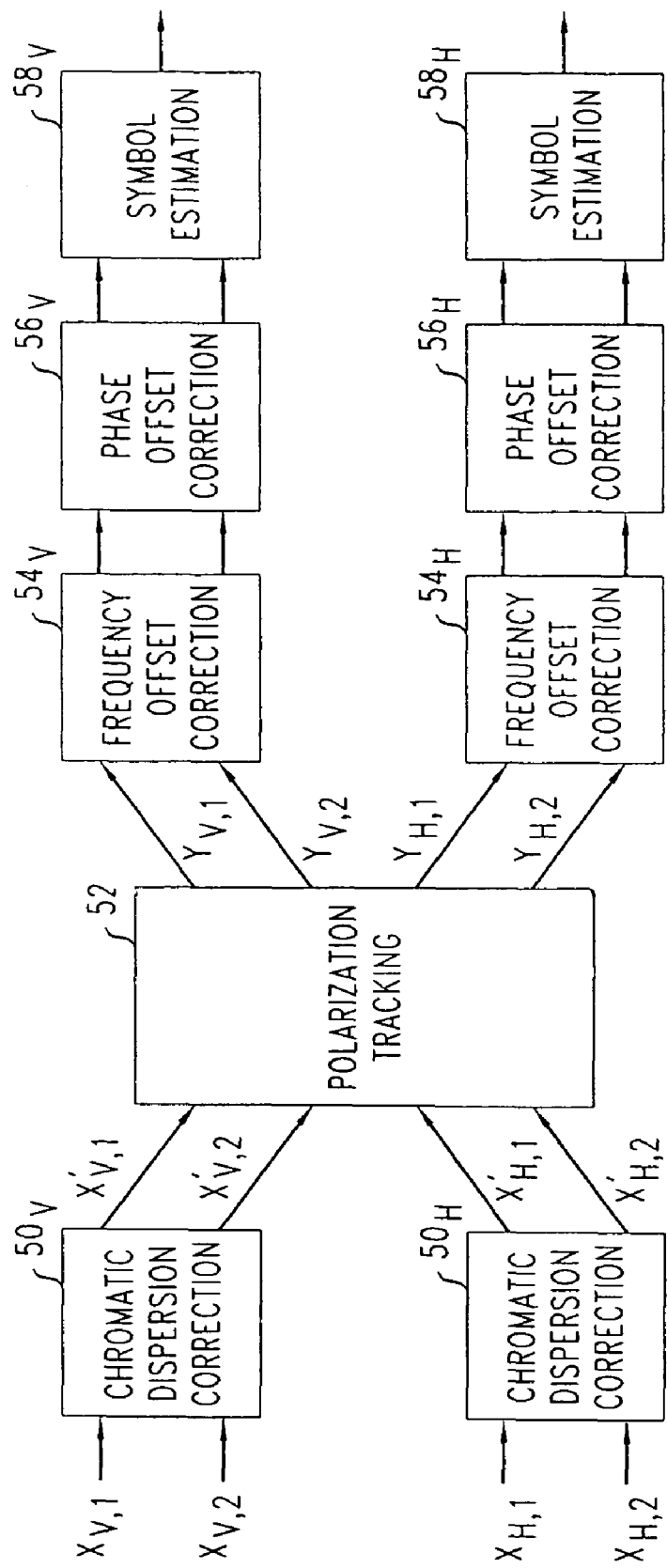
FIG. 3 is a block diagram illustrating an exemplary digital signal processor (DSP) for the polarization-sensitive optical receivers of FIGS. 1A and 1B.

FIG. 3 illustrates the functional structure of an exemplary embodiment 24 of the DSPs 24 of FIGS. 1A and 1B. The DSP 24' includes a series of structures that perform digital processing on the received $X_V(k)$s and $X_H(k)$s to enable performing better estimates of the values of the transmitted PSK symbol sequence. In the DSP 24', these structures include one or more frequency offset correctors $54_V$, $54_H$ and one or more symbol estimators $58_V$, $58_H$. In some embodiments of the DSP 24', the structures may also include chromatic dispersion correctors $50_V$, $50_H$; polarization trackers $52_V$, $52_H$; and/or phase offset correctors $56_V$, $56_H$.

Below, exemplary digital processing structures are described for an embodiment of the DSP 24' as shown in FIG. 3.

Each chromatic dispersion corrector $50_X$ processes the sequence of complex digital sampled values $X_X(k)$'s received from the hybrid optical detector $22_X$ to produce a sequence of $X_{X'}(k)$'s, i.e., $X_{X'}(k)=X_{X,1}'(k)+X_{X,2}'(k)$. In the chromatic dispersion corrector $50_X$, the processing involves passing the received sequence of complex digital sampled values through a digital finite-impulse-response (FIR) filter. The FIR filter has weight coefficients selected to correct remaining inter-symbol interference caused by chromatic dispersion or other degrading effects in the optical communications channel 14. The weight coefficients may be static or may be adaptively updatable, e.g., via feedback to a weight update unit.

The polarization tracker 52 performs digital processing configured to correct or compensate polarization-dependent degradations of the modulated optical carrier that are caused in the optical communications channel 14. The polarization-dependent degradations or distortions may include, i.e. polarization rotations, polarization transformation, and combinations of both.

Figure 4:
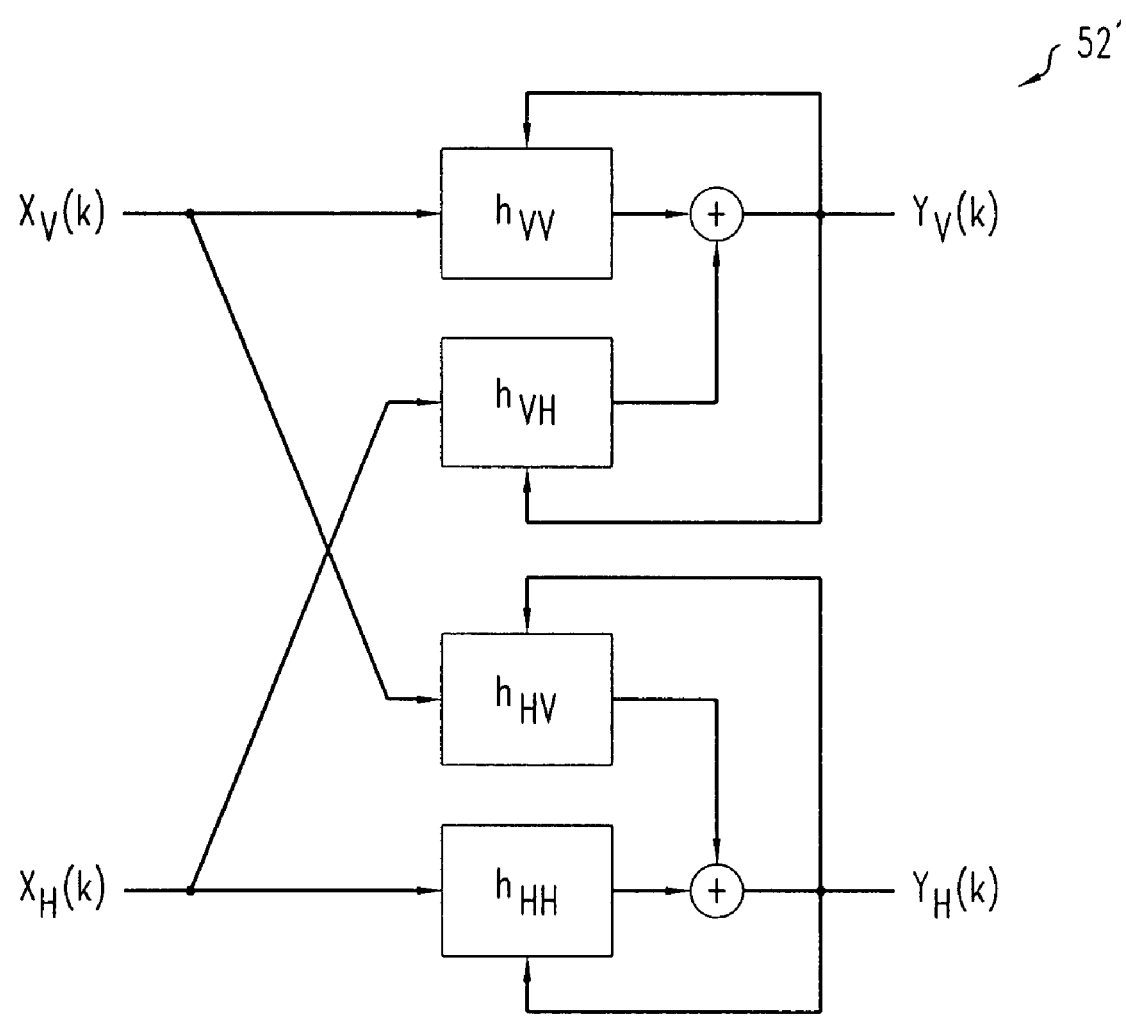
FIG. 4 is a block diagram illustrating an exemplary embodiment for a polarization tracker in the DSP of FIG. 3.

The polarization tracker 52 may include a constant modulus algorithm (CMA) adaptive FIR filter 52' as illustrated in FIG. 4. The CMA adaptive FIR filter 52' processes each received complex digital sampled values $X'(k)=[X_V'(k),X_H'(k)]^T$ with a four FIR filters that are indexed by input and output linear polarizations, i.e., (V,V), (V,H), (H,V), and (V,V). The (V,V), (V,H), (H,V), and (V,V) FIR filters have the respective weight coefficients $h_{VV}(k, m)$, $h_{VH}(k, m)$, $h_{HV}(k, m)$, and $h_{HH}(k, m)$. Here, "k" is the sampling time index and "m" is a filter tap index. From each received 2D vector of complex digital signal values, e.g., X'(k), the FIR filters produce and output a 2D vector of complex digital signal values Y(k), i.e., $Y(k)=[Y_V(k),Y_H(k)]^T$. The V and H components of Y(k) are defined as follows:

$$Y_V(k) = \sum_{m=0}^{B-1} \left[ \begin{array}{l} h_{VV}(k, m) \cdot X_V'(k - m) + \\ h_{VH}(k, m) \cdot X_H'(k + m) \end{array} \right] \quad (1)$$

and $$Y_H(k) = \sum_{m=0}^{B-1} \left[ \begin{array}{l} h_{HV}(k, m) \cdot X_V'(k - m) + \\ h_{HH}(k, m) \cdot X_H'(k + m) \end{array} \right].$$

Here, "B" is the number of taps in the CMA FIR filters, e.g., B may be 10 or less for data rates of about 10 giga-Hertz. Also, the above sums are over the values of the received digital signals at the sampling time "k" and at the earlier sampling times k–1, . . . , k–(B–1). At each sampling or at an integral multiple of the sampling period, e.g., every 20, 40, or 64 sampling periods at symbol rates of about 10 giga-Hertz, the weight coefficients $h_{VV}(k, m)$, $h_{VH}(k, m)$, $h_{HV}(k, m)$, and $h_{HH}(k, m)$ are adaptively updated based on modulus errors of the produced complex digital signal values, i.e., the $Y_V(k)$s and $Y_H(k)$s. That is, the weights coefficients are updated as follows:

$$h_{VV}(k+1,m)=h_{VV}(k,m)+\mu \cdot [\delta \epsilon_V(k) \cdot Y_V(k) \cdot X_{V'}'^*(k+m)],$$

$$h_{VH}(k+1,m)=h_{VH}(k,m)+\mu \cdot [\delta \epsilon_V(k) \cdot Y_V(k) \cdot X_{H}'^*(k+m)],$$

$$h_{HV}(k+1,m)=h_{HV}(k,m)+\mu \cdot [\delta \epsilon_H(k) \cdot Y_H(k) \cdot X_{V'}'^*(k+m)],$$
and $$h_{HH}(k+1,m)=h_{HH}(k,m)+\mu \cdot [\delta \epsilon_H(k) \cdot Y_H(k) \cdot X_{H}'^*(k+m)]. \quad (2a)$$

Here, the constant "μ" defines the speed at which the weight coefficients of the four FIR filters are updated, and $\delta \epsilon_V(k)$ and $\delta \epsilon_H(k)$ are measures of modulii errors in the produced complex digital signal values. In particular, the modulii $|Y_V(k)|$ and $|Y_H(k)|$ should be equal to a preselected constant for PSK modulation. Below, the preselected constant will be set to one. Nevertheless, these modulii may differ from one. The modulii errors $\delta \epsilon_V(k)$ and $\delta \epsilon_H(k)$ are defined as:

$$\delta \epsilon_V(k)=1-|Y_V(k)|^2 \text{ and } \delta \epsilon_H(k)=1-|Y_H(k)|^2. \quad (2b)$$

For the polarization tracker 52, suitable CMA FIR filters may be described in an article "Digital Equalisation of 40 Gbit/s per Wavelength Transmission over 2480 km of Standard Fibre without Optical Dispersion Compensation" by S. J. Savory et al, published in the "Proceedings of the 32nd European Conference of optical communications" (ECOC), vol. 4, pages 105-106, Sep. 28, 2006 and in an article "Blind Equalization Using the Constant Modulus Criterion: A Review" by C. Richard Johnson, J R. et al, published in Proceedings of the IEEE, vol. 86, No. 10, October 1998, pages 1927-1950. Both these articles are incorporated herein by reference in their entirety.

In other embodiments, the polarization tracker 52 may incorporate other digital devices that are adapted to correct polarization-dependent degradations of the modulated optical carrier, e.g., PMD. For example, the polarization tracker 52 may incorporate a polarization tracking unit that is not based on a FIR filter. Such a polarization tracking unit may be described in U.S. patent application Ser. No. 11/644,555, filed by Ut-Va Koc on Dec. 22, 2006, which is incorporated herein by reference in its entirety.

The frequency offset correctors $54_X$ perform processing that corrects or compensates for a relative phase error of the complex digital signals output by the hybrid optical detectors 22X, wherein relative phase error is due to a frequency offset. In particular, the relative phase error to be corrected or compensated is due to the frequency offset between the local optical oscillator 18 and the modulated optical carrier received from the optical communications channel 14. This correction of an undesired effect due the frequency offset may be performed by passing the received complex digital data values, e.g., the $Y_X(k)$s, through an exemplary frequency offset corrector $54_X'$ show in FIG. 5.

Figure 5:
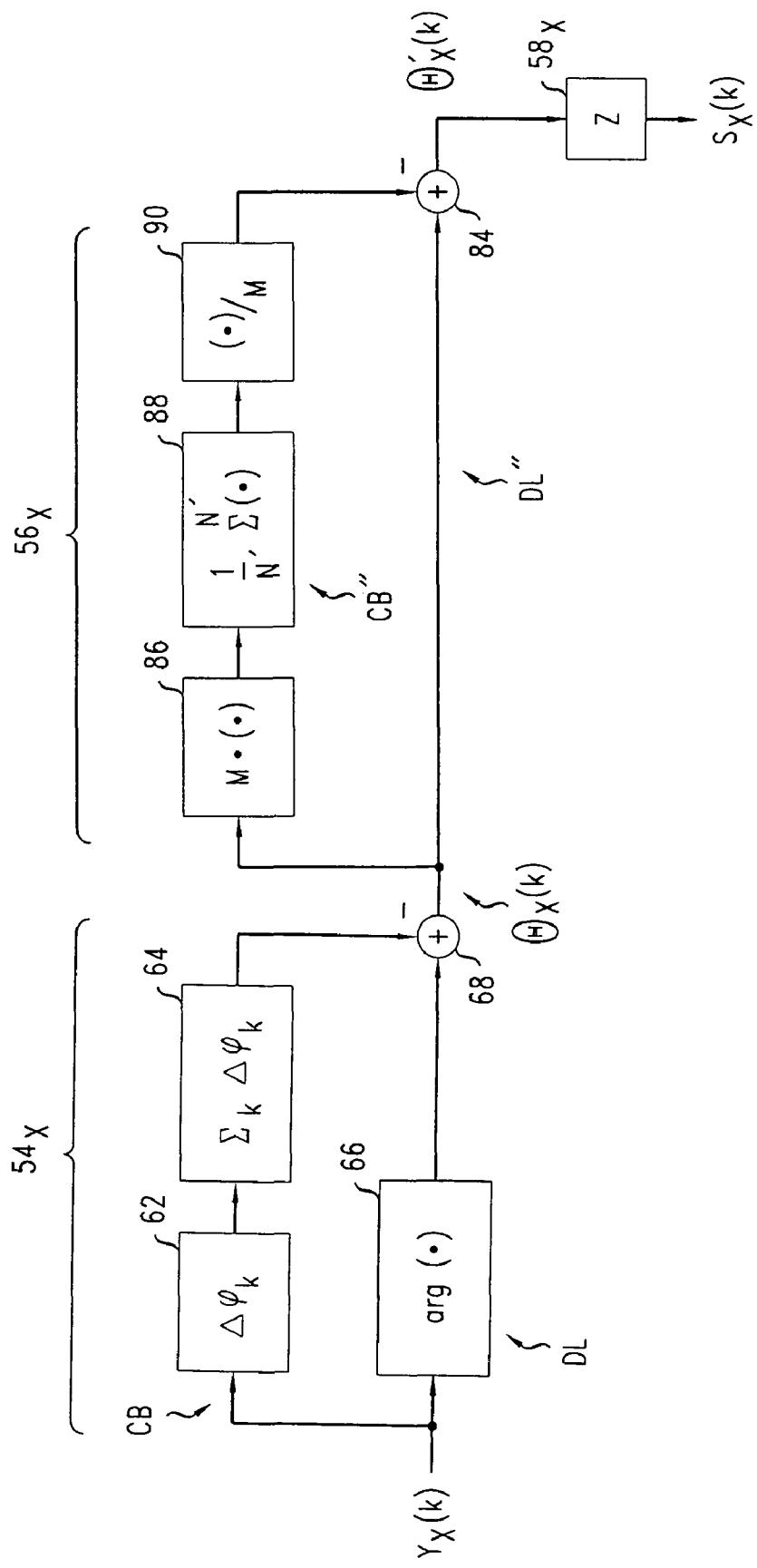
FIG. 5 is a block diagram illustrating exemplary structures for frequency offset and phase offset correctors in the DSP of FIG. 3.

Referring to FIG. 5, the frequency offset corrector $54'_X$ includes a correction branch CB, which has a frequency offset estimator 62; an accumulator 64, and direct line DL, which has an argument evaluator 66; and a digital adder 68. Both the direct line DL and the correction branch CB receive each complex digital signal value $Y_X(k)$ that is produce at the appropriate outputs of the polarization tracker 52 of FIG. 3.

On the direct line DL, the argument evaluator 66 determines the phase angle of each received complex digital signal value $Y_X(k)$ and outputs said phase angle to the plus input of the digital adder 68.

On the correction branch CB, the frequency offset estimator 62 determines an incremental phase angle offset, i.e., $\Delta\phi_k$, that the received complex digital signal value $Y_X(k)$ has over the last received complex digital signal value $Y_X(k-1)$. Here, the incremental phase angle offset $\Delta\phi_k$ is due to the frequency offset $[\omega_{MC}-\omega_{RC}]$ between the local optical oscillator 18 and the modulated optical carrier that is received from the optical communications channel 14.

On the correction branch CB, the accumulator 64 adds the determined incremental phase offset $\Delta\phi_k$ for the sampling period "k" to the sum of earlier such determined phase angle offsets, i.e., $\Sigma_r^{k-1}\Delta\phi_r$, to produce a cumulative phase angle offset. Then, the cumulative phase angle offset, i.e., $\Sigma_r^k\Delta\phi_r$, due to the frequency offset is delivered to the minus input of the digital adder 68.

The digital adder 68 subtracts the cumulative phase angle offset, which was caused by the frequency offset, from the phase argument angle of the present received complex digital signal value $Y_X(k)$ to produce the frequency-offset compensated phase argument angle $\Theta_X(k)$.

Figure 6:
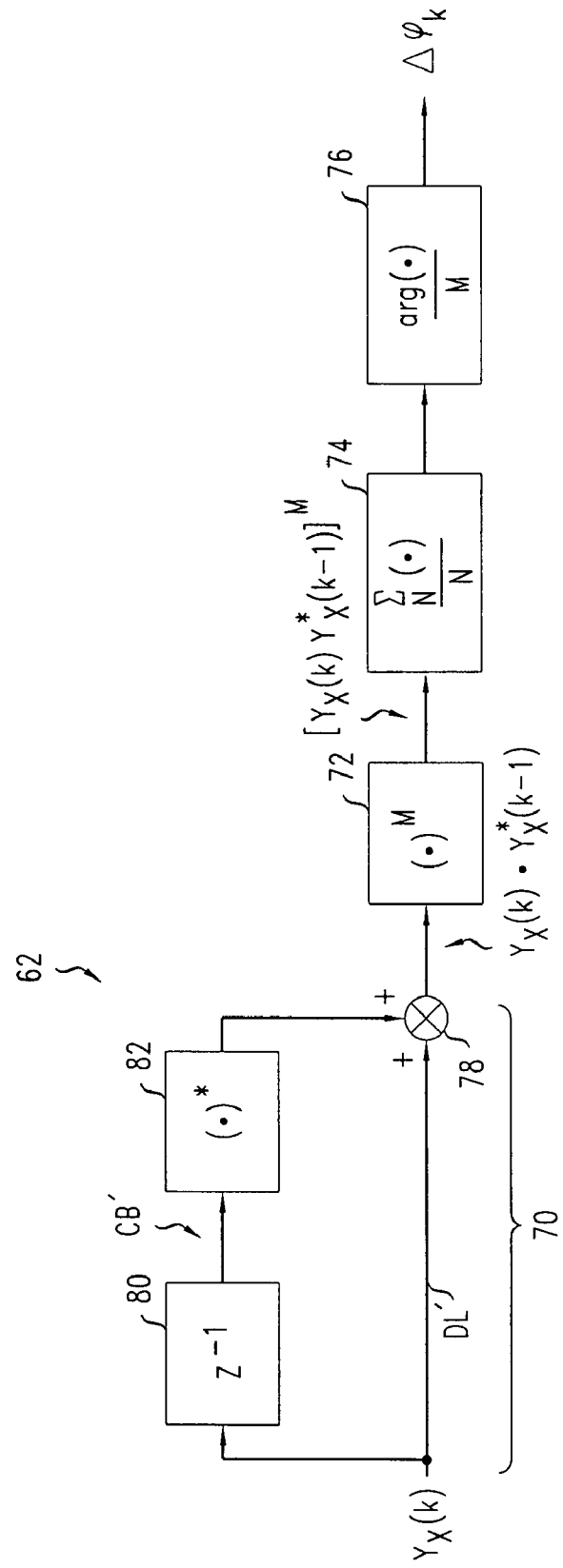
FIG. 6 is a block diagram illustrating an exemplary structure for a frequency offset estimator in the frequency offset corrector of FIG. 5.

FIG. 6 illustrates an exemplary structure 62' for the frequency offset estimator 62 of FIG. 5. The frequency offset estimator 62' includes a discrete phase differentiator 70, a fixed power unit 72, an averager 74, and an angle evaluator 76.

The discrete phase differentiator 70 includes a correction branch CB' that connects to a first input of a digital multiplier 78 and a direct line DL' that connects to a second input of the digital multiplier 78. The correction branch CB' includes a delay unit 80 and a complex conjugator unit 82 that complex conjugates received complex digital signal values. Together the units 80, 82 enable the correction branch CB' to output a complex conjugate of the previously received complex digital signal value $Y_X(k-1)$ during the period that the direct line DL' outputs the presently received complex digital signal value $Y_X(k)$. Then, for sampling period "k", the digital multiplier 78 outputs a complex signal value $Y_X(k) \cdot Y_X^*(k-1)$ whose phase is the phase of the complex digital signal value for the sampling period "k" minus the phase of the received complex digital signal value for the sampling period $(k-1)$. Thus, the discrete phase differentiator 70 outputs a complex digital signal value whose phase is the incremental change to the phase over one sampling period.

The discrete phase differentiator 70 outputs a complex digital signal value that has a product of phase factors due to PSK modulation and noise and due to the frequency offset between the local optical oscillator 18 and the modulated optical carrier received from the optical communications channel 14. The phase factor due to PSK modulation data has the form $\exp(iN\pi/M)$ where N is an integer and M is the number of symbols in the PSK symbol constellation. To remove this factor, the fixed power unit 72 raises to power "M" each complex digital signal value that is received from the digital multiplier 78, e.g., $Y_X(k) \cdot Y_X^*(k-1)$. Raising the received symbol to the power "M" removes the phase dependence due to PSK modulation. The averager 74 averages the received complex signal values, e.g., $Y_X(k) \cdot Y_X^*(k-1)$, for N' consecutive values of the sampling period index "k". Here, the integer N' may be about 500 for a data rate of about 10 giga-Hertz. The averaging substantially reduces or removes the phase factor due to noise. Finally, the angle evaluator 76 extracts an estimate of the incremental phase argument offset $\Delta\phi_k$ that was caused by the frequency offset between the local optical oscillator 18 and the received modulated optical carrier at the sampling period "k". To extract $\Delta\phi_k$, the angle evaluator 76 evaluates the argument of the averaged complex digital signal value output by the averager 74 and divides said value by M.

The phase offset corrector $56_X$ performs digital processing that corrects or compensates for slowly changing phase shifts between the local optical oscillator 18 and the modulated optical carrier received from the optical communications channel 14. This correction may be produced by passing the frequency-offset-corrected phase arguments, i.e., the $\Theta_X(k)$s, which are output by the exemplary frequency offset corrector $54_X$, through phase offset corrector $56_X'$ as show in FIG. 5.

Referring to FIG. 5, the phase offset corrector $56_X'$ has a correction branch CB", a direct line DL", and a digital adder 84. Both the correction branch CL" and the direct line DL" receive each frequency-offset-corrected phase argument $\Theta_X(k)$. The correction branch CB" includes a first multiplier 86, an averager 88, and a second multiplier 90, which are serially connected therein. The first multiplier 86 multiplies each received frequency-offset-corrected argument $\Theta_X(k)$ by the integer "M" to obtain a phase argument value modulus $2\pi$ that does not substantially depend on the PSK modulation data carried on the original complex signal value. The averager 88 averages the received phase argument values from the first multiplier 86 over N" sampling periods to obtain an averaged phase argument shift for the sample period "k" that is less susceptible to noise. For QPSK data transmission rates of about 10 giga-Hertz, the averager 88 may average over about 2 to 15 sampling periods, e.g., 10 sampling periods. The averager 88 outputs each averaged phase argument shift to the second multiplier 90, which divides by "M" to obtain an average phase argument offset. The digital adder 84 subtracts the average phase argument offset, which is output by the correction branch CB", from the frequency-shift-corrected argument $\Theta_X(k)$, which is obtained from the direct line DL", to obtain the final corrected argument value $\Theta_X'(k)$ for the sampling period "k".

Each symbol estimator $58_X$ performs one or more digital comparisons to estimate the PSK symbol value $S_X(k)$ that corresponds to each final corrected argument values $\Theta_X'(k)$. In particular, the symbol estimators $58_X$ perform one or more digital comparisons for each received $\Theta_X'(k)$ to obtain an estimate of the symbol $S_X(k)$, i.e., in a manner functionally similar to a slicer.

Some embodiments of optical receivers are not configured for data that is polarization multiplexed onto the optical carrier.

Figure 7:
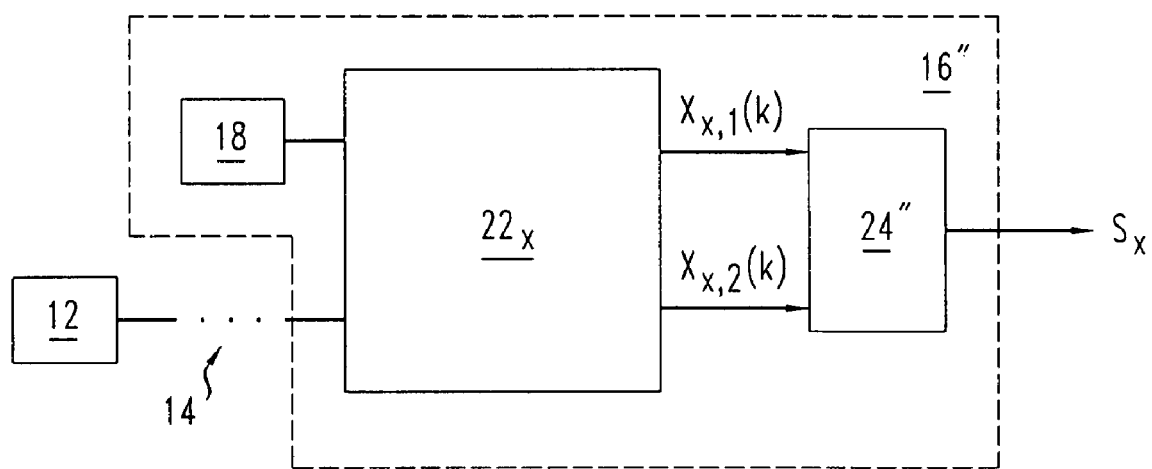
FIG. 7 is a block diagram for an optical receiver for a PSK modulated optical carrier that has not been polarization multiplexed.

FIG. 7 illustrates an embodiment of an optical receiver 16" configured to receive and recover a transmitted symbol stream from a PSK modulated optical carrier that has not been polarization multiplexed. The optical receiver 16" includes the free-running local optical oscillator 18, the hybrid optical detector 22$_X$ of FIG. 2 and a DSP 24". In each sampling period "k", the hybrid optical detector 22$_X$ produces a complex digital sampled value [X$_{X,1}$(k)+iX$_{X,2}$(k)] in response to measuring the single "X" linear polarization component of light mixtures of the received modulated optical carrier and the reference optical carrier, i.e., mixtures output by the optical mixers 32A, 32B.

As illustrated in FIG. 8, the DSP 24" includes a sequence of digital processing structures, which include the frequency offset corrector 54$_X$, and the symbol estimator 58$_X$. The DSP may also include the chromatic dispersion corrector 50$_X$, which would directly connect the frequency offset corrector 54$_X$. The digital processing structures may also include the phase offset corrector 56$_X$. Exemplary embodiments of the processing structures 52$_X$, 54$_X$, 56$_X$, 58$_X$ have been described with respect to FIGS. 3, 4, 5, and 6.

From the above disclosure, the figures, and the claims, other embodiments will be apparent to those of skill in the art.

What we claim is:

1. An apparatus, comprising:
    an optical receiver for receiving a PSK modulated optical carrier from an optical communications channel, comprising:
    an optical hybrid configured to output first mixtures of the modulated optical carrier and a reference optical carrier at first outputs and to output second mixtures of the carriers having different relative phases at second outputs;
    a first light detector configured to generate first digital values by sampling light intensities at the first outputs;
    a second light detector configured to generate second digital values by sampling light intensities at the second outputs, the first and second digital values of a sampling period forming a first complex sampled value thereof; and
    a digital signal processor configured to receive the complex sampled values and to correct a phase of each complex sampled value to compensate for a frequency offset between the modulated and reference optical carriers, the digital signal processor being configured to average M-th integer powers of a sequence of signal values to evaluate the corrected phase, each of the signal values of the sequence being a product of one of the complex sampled values with a complex conjugate of another of the complex sampled values, the one and another of the complex sampled values being successive ones of the complex sampled values, the digital signal processor being configured to estimate symbols on the modulated optical carrier from the corrected phases, M-th powers of the complex sampled values having phases independent of the PSK modulation of the modulated optical carrier.

2. The apparatus of claim 1, wherein the digital signal processor is configured to offset each corrected phase to compensate for a phase shift between the reference and modulated optical carriers by averaging a set of the corrected phases, the corrected phases of the set being adjusted to remove dependence on the PSK modulation.

3. The apparatus of claim 1, further comprising:
    a third light detector configured to generate third digital values by sampling light intensities of another polarization component for mixtures of the carriers;
    a fourth light detector configured to generate fourth digital values by sampling light intensities of the another polarization component for mixtures of the carriers of a different relative phase than the mixtures sampled by the third light detector, the third and fourth digital values of a sampling period forming a second complex sampled value thereof.

4. The apparatus of claim 3, wherein the digital signal processor is configured to receive the second complex sampled values and to correct phases thereof to compensate for frequency offsets between the modulated and reference optical carriers, the digital signal processor being configured to evaluate the corrected phase of each second complex sampled value by averaging the M-th powers of second signal values, each second signal value having a phase equal to a phase offset between a corresponding pair of successive ones of the second complex sampled values.

5. The apparatus of claim 4, wherein the digital signal processor is configured to perform transformations that linearly mix the first and second complex sampled values in a manner that compensates polarization rotations of the modulated optical carrier produced after transmission to an optical communications channel.

6. The apparatus of claim 1, wherein the digital signal processor is configured to correct the complex sampled values for interference caused by an effect of chromatic dispersion on the modulated optical carrier in the optical communications channel.

7. The apparatus of claim 1, wherein the digital signal processor is configured to correct modulus variations of the complex sampled values caused by polarization-dependent degradation of the modulated optical carrier in the optical communications channel.

8. A method of determining symbols PSK modulated on an optical carrier received from an optical communications channel, the method comprising:
    in an optical hybrid, interfering a first polarization component of the modulated optical carrier and a reference optical carrier with a first relative phase;
    in the optical hybrid, interfering the first polarization component of the modulated optical carrier and the reference optical carrier with a second relative phase different from the first relative phase;
    sampling the carriers interfered with the first relative phase to produce first digital values;
    sampling the carriers interfered with the second relative phase to produce second digital values, the first and second digital values of a sampling period forming a first complex sampled value thereof; and
    correcting a phase of each first complex sampled value to compensate for a frequency offset between the modulated and reference optical carriers, each correcting a phase including averaging M-th integer powers of signal values of a sequence, each signal value of the sequence having a phase equal to a phase offset between a corresponding pair of successive ones of the complex sampled values, the M-th powers of the complex sampled values having phases independent of the PSK modulation of the modulated optical carrier.

9. The method of claim 8,
    wherein the digital signal processor is configured to offset each corrected phase to correct for a phase shift between the reference and modulated optical carriers by averaging a set of the corrected phases, the corrected phases of the set being adjusted to remove dependence on the PSK modulation.

10. The method of claim 8, further comprising compensating the complex sampled values for polarization rotations caused by transmission over the optical communications channel.

11. The method of claim 8, further comprising:
producing third digital values by sampling another polarization component of a mixture produced by interfering the carriers with a specific relative phase;
producing fourth digital values by sampling the another polarization component of a mixture produced by interfering carriers with a relative phase different from the specific relative phase, the third and fourth digital values of a sampling period forming a second complex sampled value thereof; and
estimating values of symbols nontrivially polarization multiplexed onto the modulated optical carrier based on the first and second complex sampled values.

12. The method of claim 11, further comprising correcting a phase of each second complex sampled value to compensate for a frequency offset between the modulated and reference optical carriers, each correcting a phase of one of the second complex sampled values including averaging the M-th integer powers of second signal values, each second signal value having a phase equal to a phase offset between a corresponding pair of successive ones of the second complex sampled values.

13. The method of claim 8, wherein the correcting includes adjusting the complex sampled values to correct for interference caused by an effect of chromatic dispersion on the modulated optical carrier in the optical communications channel.

14. The method of claim 8, wherein the correcting includes correcting modulus variations of the complex sampled values caused by polarization-dependent degradation of the modulated optical carrier in the optical communications channel.

15. The method of claim 8, wherein the act of interfering a first polarization component of the modulated optical carrier and a reference optical carrier with a first relative phase and the act of interfering the first polarization component of the modulated optical carrier and the reference optical carrier with a second relative phase are performed in different optical mixers.

* * * * *